United States Patent [19]
Hsieh et al.

[11] Patent Number: 5,605,654
[45] Date of Patent: Feb. 25, 1997

[54] METHOD AND APPARATUS TO IMPROVE VAPOR DISTRIBUTION IN MASS TRANSFER AND HEAT EXCHANGE COLUMNS

[75] Inventors: Chang-Li Hsieh, Carlisle, Mass.; Neil Yeoman, Merrick, N.Y.; O. Jeffrey Berven, Wichita, Kans.

[73] Assignee: Koch Engineering Company, Inc., Wichita, Kans.

[21] Appl. No.: 604,671

[22] Filed: Feb. 21, 1996

Related U.S. Application Data

[63] Continuation-in-part of Ser. No. 195,533, Feb. 14, 1994, Pat. No. 5,516,465, which is a continuation-in-part of Ser. No. 101,924, Aug. 4, 1993, abandoned.

[51] Int. Cl.$^6$ ...................................................... B01F 3/04
[52] U.S. Cl. .............................. 261/79.2; 261/96; 261/109
[58] Field of Search .............................. 261/79.2, 96, 109

[56] References Cited

U.S. PATENT DOCUMENTS

| | | |
|---|---|---|
| 2,560,071 | 7/1951 | Bloomer . |
| 2,582,826 | 1/1952 | Glitsch . |
| 2,596,106 | 5/1952 | Schneible . |
| 2,611,596 | 9/1952 | Glitsch . |
| 2,649,291 | 8/1953 | Bartolucci . |
| 3,008,553 | 11/1961 | Glitsch et al. . |
| 3,013,782 | 12/1961 | Glitsch . |
| 3,019,003 | 1/1962 | Glitsch . |
| 3,037,754 | 6/1962 | Glitsch . |
| 3,079,134 | 2/1963 | Winn . |
| 3,080,155 | 3/1963 | Glitsch et al. . |
| 3,087,711 | 4/1963 | Glitsch . |
| 3,217,469 | 11/1965 | Eckert . |
| 3,233,708 | 2/1966 | Glitsch . |
| 3,343,821 | 9/1967 | Winn et al. . |
| 3,348,364 | 10/1967 | Henby . |
| 3,448,038 | 6/1969 | Pall et al. . |
| 3,637,195 | 1/1972 | Blazer et al. . |
| 3,959,419 | 5/1976 | Kitterman . |
| 3,969,447 | 7/1976 | Glitsch et al. . |
| 4,008,056 | 2/1977 | Potter . |
| 4,086,307 | 4/1978 | Glaspie . |
| 4,120,919 | 10/1978 | McClain . |
| 4,123,008 | 10/1978 | McClain . |
| 4,198,002 | 4/1980 | McClain . |
| 4,333,894 | 6/1982 | Hoppe et al. . |
| 4,398,827 | 8/1983 | Dietrich . |
| 4,424,059 | 1/1984 | Chang . |
| 4,424,069 | 1/1984 | Chang ..................................... 261/79.2 |
| 4,597,916 | 7/1986 | Chen . |
| 4,604,247 | 8/1986 | Chen et al. . |
| 4,729,857 | 3/1988 | Lee et al. . |
| 4,782,857 | 11/1988 | Bieri ........................................ 261/97 |
| 4,810,428 | 3/1989 | Aly et al. ................................. 261/96 |
| 4,842,778 | 6/1989 | Chen et al. . |
| 4,909,967 | 3/1990 | Binkley et al. . |
| 4,950,430 | 8/1990 | Chen et al. . |
| 4,956,127 | 9/1990 | Binkley et al. . |
| 5,106,544 | 4/1992 | Lee et al. ............................... 261/79.2 |
| 5,156,659 | 10/1992 | Wright . |
| 5,338,447 | 8/1994 | Vellinga ................................. 261/79.2 |

FOREIGN PATENT DOCUMENTS

| | | |
|---|---|---|
| 0231841 | 8/1987 | European Pat. Off. . |
| 1156341 | 5/1958 | France . |
| 1481836 | 3/1967 | France . |
| 600807 | 8/1934 | Germany . |
| 764103 | 9/1952 | Germany . |
| 9201537 | 2/1992 | WIPO . |

*Primary Examiner*—Tim R. Miles
*Attorney, Agent, or Firm*—Shook, Hardy & Bacon L.L.P.

[57] ABSTRACT

A mass transfer or heat exchange column is provided with a vapor distributor which circulates a vapor stream about the inner periphery of the column. The vapor stream is discharged from the distributor through an at least partially open bottom and, optionally, a plurality of spaced apart outlet ports in an inner annular wall of the distributor. A deflector extends upwardly along the inner annular wall to deflect the vapor stream away from a circumferential flow path along the inward face of the wall. The deflector may also extend outwardly under the flow channel to deflect, in a radially inward direction, vapor exiting the flow channel through the open bottom of the distributor.

31 Claims, 8 Drawing Sheets

METHOD AND APPARATUS TO IMPROVE VAPOR DISTRIBUTION IN MASS TRANSFER AND HEAT EXCHANGE COLUMNS

This is a continuation-in-part of application Ser. No. 08/195,533, filed Feb. 14, 1994, now U.S. Pat. No. 5,516,465, which is a continuation-in-part of application Ser. No. 08/101,924, filed Aug. 4, 1993, now abandoned.

BACKGROUND OF THE INVENTION

This invention relates in general to mass transfer and heat exchange columns and, more particularly, to a method and apparatus to improve vapor distribution in such columns.

Vapor and liquid interaction is required in many types of mass transfer and heat exchange processes. Typically, the vapor stream is introduced to a column below a region containing trays or a random or structured packing while the liquid stream is introduced into the column above the trays or packing. The vapor and liquid streams then flow in countercurrent relation through the region, with the tray or packing serving to distribute the downwardly flowing liquid stream over a larger surface area to enhance the interaction with the upwardly flowing vapor stream.

In order to increase the efficiency of the mass transfer or heat exchange taking place between the vapor and liquid streams, it is important that the vapor be uniformly distributed across the horizontal cross-section of the column, particularly at the lower vapor-liquid interface where the vapor enters the packing. When the vapor is introduced to the column below the packing, the velocity of the vapor can prevent the desired horizontal distribution of the vapor prior to its entry into the packing. In order to improve the vapor distribution, deflectors have been positioned in some columns in the flow path of the vapor to deflect the vapor in a plurality of directions. Another example of a conventional vapor distributor known as a vapor horn is disclosed in U.S. Pat. No. 5,106,544. The vapor horn disclosed in that patent comprises an annular housing which is open at the bottom and contains a plurality of vanes for causing downward deflection of the circumferentially flowing vapor stream. The downwardly deflected vapor is then said to rise in a uniform manner into a packing bed which is positioned radially inwardly from the vapor horn.

While circumferential vapor horns can function satisfactorily in many applications, it has been determined that a maldistribution of the vapor stream may result under certain operating conditions. This maldistribution is believed to be caused by the vapor stream traveling through a swirling or cyclonic flow path after it is discharged from the vapor horn. A low velocity zone is created in the center of the column and a high velocity zone is created adjacent the inner wall of the vapor horn as a result of this cyclonic vapor flow. These velocity differentials then reduce the amount of vapor entering the center portion of the overlying packing and increase the amount of vapor in the radial outer portions of the packing. Once the vapor has entered the packing, this maldistribution of vapor cannot be readily corrected and reduces the efficiency of the mass transfer occurring within the packing.

A need has arisen for an improved circumferential vapor distributor or horn which will overcome this cyclonic effect to provide a more uniform distribution of vapor across the horizontal cross-section of a mass transfer or heat exchange column.

SUMMARY OF THE INVENTION

It is a primary object of this invention to provide a circumferential vapor distributor which is effective to increase the horizontal distribution of vapor entering a mass transfer or heat exchange column so that enhanced vapor and liquid interaction in the column can be achieved.

It is another primary object of this invention to reduce the horizontal maldistribution of vapor after it has entered the column by disrupting the cyclonic effect which may result from circumferential discharge of the vapor stream from a vapor distributor.

To accomplish these and other related objects, in one aspect the invention is directed to a vapor distribution apparatus for placement within a mass transfer or heat exchange column having an external shell, a vapor inlet nozzle which extends through the external shell and an open interior volume through which vapor and liquid streams may flow and interact. The apparatus comprises: a distributor defining an annular flow channel adapted for placement in vapor flow communication with the vapor inlet nozzle to receive a vapor stream entering the column through the vapor inlet nozzle and convey the vapor stream in at least one direction of flow about an inner periphery of the column shell, the distributor having an inner annular wall which defines a radially inner wall of the flow channel and a top plate which forms an at least substantially closed top of the flow channel, the inner annular wall having a outward side facing the flow channel and an inward side facing away from the flow channel, the distributor further having an at least partially open bottom in vapor flow communication with the flow channel to permit at least portions of the vapor stream in the flow channel to be discharged through the at least partially open bottom, and including a deflector having a first portion extending generally upwardly along the inward side of the inner annular wall to contact vapor traveling circumferentially along the inward side of the inner annular wall and divert it away therefrom. A second portion of the deflector extends below the inner annular wall to divert, in a radially inward direction, a portion of the vapor stream discharged through the at least partially open bottom of the distributor.

In a still further aspect, the invention is directed to a method for distributing a vapor stream from the distributor within the column. The method comprises the steps of: introducing the vapor stream into the distributor through a vapor inlet nozzle which extends through an external shell of the column; directing the vapor stream in a circumferential direction within the distributor; discharging at least a portion of the vapor stream from within the distributor through an at least partially open bottom of the distributor; allowing the discharged vapor stream to rise through an inner annular space within the distributor while traveling in the circumferential direction; and contacting the rising vapor stream against a deflector having a first portion extending generally upwardly along a radially inward side of an inner annular wall of the distributor to divert the rising vapor stream away from the circumferential direction to cause a more uniform horizontal distribution of the rising vapor stream.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENTS

Figures 1, 2, 4:
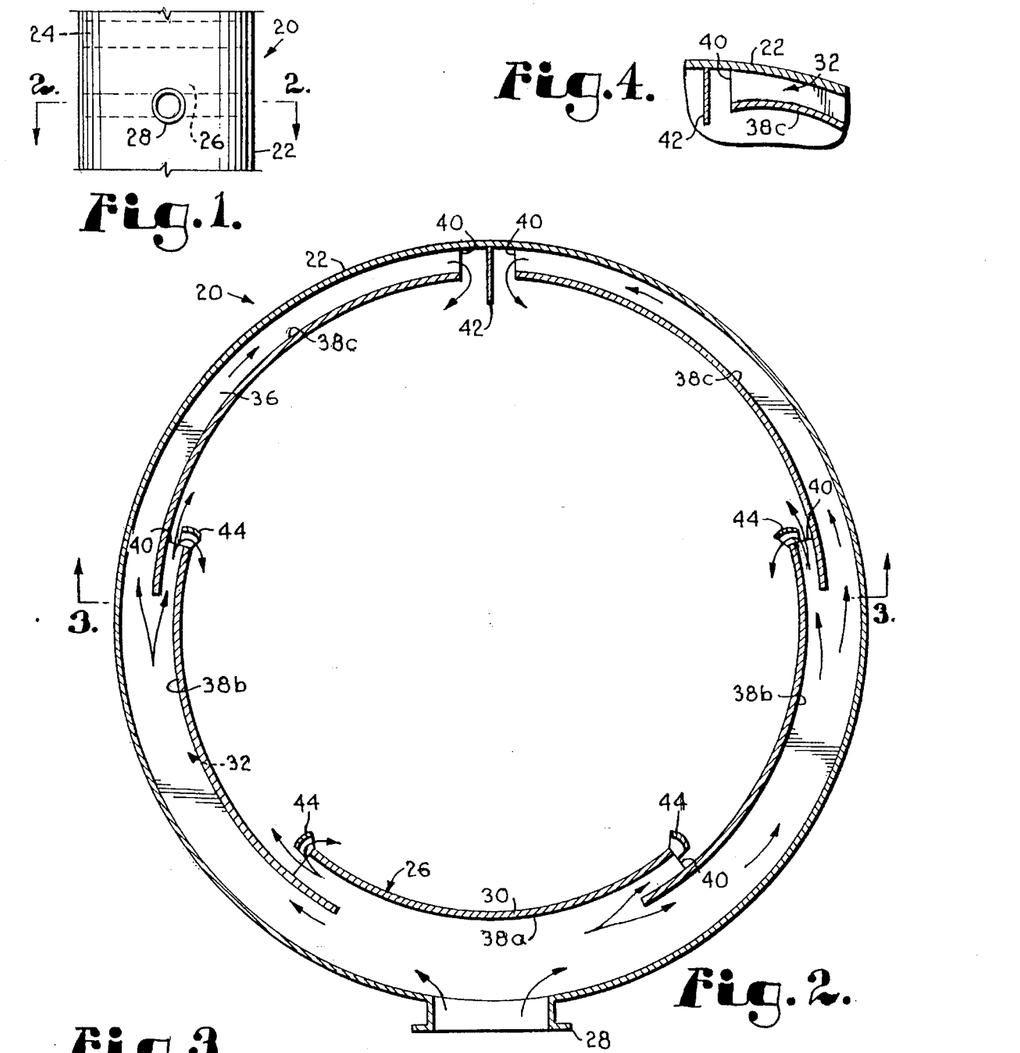
FIG. 1 is a fragmentary side elevation view of a column in accordance with the present invention showing a vapor inlet nozzle and a vapor distributor and a packing zone which are illustrated by broken lines.
FIG. 2 is an enlarged top plan view of the column and vapor distributor taken in horizontal section along line 2—2 of FIG. 1 in the direction of the arrows, the direction of flow of the vapor through the distributor being illustrated by arrows.
FIG. 4 is a fragmentary top plan view of an end portion of an alternate embodiment of a vapor distributor of the present invention.
Figure 3:
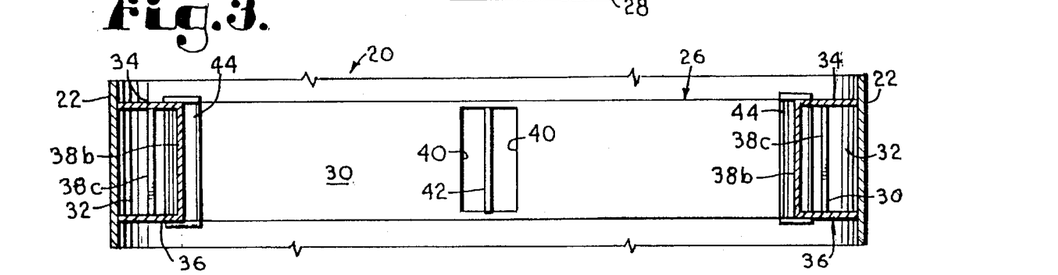
FIG. 3 is a side elevation view of the column and vapor distributor taken in vertical section along line 3—3 of FIG. 2 in the direction of the arrows.

Turning now to the drawings in greater detail, and initially to FIGS. 1–3, a column constructed according to a first embodiment of the present invention is represented by the numeral 20. Column 20 comprises a rigid exterior shell 22 which is of cylindrical construction and presents an open internal volume through which fluid streams may flow. The column shell 22 can also be of other desired configurations including those which are of square, rectangular or other polygonal cross section. The column 20 can be a mass transfer and/or heat transfer column, depending upon the types of chemical processing operations which are to be performed within column 20.

Column 20 includes a zone 24 in which trays or packing are positioned to facilitate interaction between liquid and vapor streams flowing through the open internal volume of the column. The packing can be random or structured packing and multiple zones of such packing and/or trays can be provided. It will be appreciated that the column 20 can include reboilers, reflux lines and other components which are necessary or desired for the particular chemical processing being conducted within the column.

The column 20 also includes a vapor horn or distributor 26 constructed in accordance with the present invention to facilitate a more uniform distribution of vapor as it flows upwardly and enters packing zone 24. It will be appreciated that liquid can be and usually is associated with the vapor and the use of the term "vapor" is intended to encompass the presence of liquid. The vapor distributor 26 is positioned in a plane beneath the trays or packing in zone 24 and is in communication with a radial inlet nozzle 28 which extends through the column shell 22 to allow the introduction of vapor into the column 20 in a direction generally perpendicular to the column shell. As can best be seen in FIG. 2, the distributor 26 includes an inner annular wall 30 which is spaced radially inwardly from the column shell 22 in the same general horizontal plane as the inlet nozzle 28. The annular wall 30 and column shell 22 form the sides of an annular plenum 32 which provides a vapor flow path around the inner circumference of the column shell 22.

As is shown in FIG. 3, the plenum 32 is generally rectilinear and is closed at the top by a ring-shaped top plate 34 which extends horizontally between the inner annular wall 30 and the column shell 22. A ring-shaped bottom plate 36 closes the bottom of the plenum 32 and likewise extends between the inner annular wall 30 and column shell 22. The top and bottom plates 34 and 36 are secured to the inner annular wall 30 in a suitable manner such as by welding and can be secured to the inner surface of the column shell 22 in a similar manner. The inner annular wall 30 and plates 34 and 36 can be constructed of various suitable materials which are sufficiently rigid to withstand the pressures exerted by the vapor stream flowing through plenum 32. The material selected should also be compatible with and be resistant to degradation by the vapor and liquid encountered within the column 20.

Returning to FIG. 2, the inner annular wall 30 comprises a plurality of circumferentially extending segments 38a, 38b and 38c which are radially staggered to form outlet ports 40 along the circumference of the annular wall 30. Each outlet port 40 allows a portion of the vapor stream flowing in plenum 32 to be directed through the outlet port 40 and into the open area of column 20 located radially inward from the annular wall 30. The use of a plurality of the outlet ports 40 allows the vapor stream in plenum 32 to be divided into a number of smaller individual streams which are directed from the plenum at spaced apart locations. The division of the vapor stream in this manner allows for turbulent mixing of the vapor streams in the open area, which in turn results in a more uniform distribution of the vapor across the horizontal cross section of the column 20 than could be achieved if the vapor were simply allowed to pass into the column interior directly from the vapor inlet nozzle 28.

The inner annular wall segments 38a, 38b and 38c are generally concentric with the column shell 22 but each segment is radially offset from the adjacent segment so that the width of the plenum 32 becomes progressively more restricted in the direction of flow of the vapor stream. The wall segment 38a is located at the vapor inlet nozzle 28 and serves to divide the vapor stream entering the column 20 through nozzle 28 into two streams flowing circumferentially in opposite directions within plenum 32. The wall segments 38b located adjacent and downstream from the wall segment 38a are spaced radially outward from the wall segment 38a and overlap the ends thereof to form the sides of the outlet ports 40. Similarly, the wall segments 38c overlap the ends of wall segments 38b and are spaced more closely to the column shell 22 than wall segments 38b.

At the downstream end of the wall segments 38c, the outlet ports 40 are formed by the spacing between the wall segments 38c and the column shell 22. The downstream end of wall segments 38c and the corresponding outlet ports 40 are located approximately 180° from the vapor inlet nozzle 28, although other locations are possible and may be preferred in some applications. A deflector 42 is mounted to the column shell 22 at a position between the outlet ports 40 at the downstream end of the wall segments 38c so that the vapor discharge from such ports is deflected radially inwardly. Although the deflector 42 is shown as being of planar construction, it will be appreciated that curvilinear surfaces could be provided if desired. In addition, the downstream ends of the wall segments 38c could be flared radially inwardly to increase the cross-sectional area of the associated outlet ports 40 as shown in FIG. 4.

Because the width of the outlet ports 40 corresponds to the radial spacing of wall segments 38a, 38b and 38c, it will be apparent that the quantity of vapor passing through each port 40 can be predetermined by positioning the wall segments at the desired radial locations. Preferably, each port 40 has approximately the same cross-sectional area so that the vapor stream flowing in the plenum 32 is evenly divided among the outlet ports 40 and the velocity of the vapor stream exiting each outlet port 40 is substantially the same. It can be appreciated that splitting the vapor stream in this fashion allows it to enter the open interior volume of the column 20 in a more uniform manner. The number of outlet ports 40 can also be varied from that shown by increasing or decreasing the number of segments of the inner annular wall 30. In general, increasing the number of outlet ports 40 causes a more uniform distribution of the vapor stream within the column interior. The quantity of vapor exiting each port 40 can also be controlled by varying the distance of overlap of the wall segments 38a, 38b and 38c at each port 40.

The outlet ports 40 discharge the multiple vapor streams in a circumferential direction within a common horizontal plane. If desired, a curved deflector 44 can be positioned within a portion of the vapor discharge stream adjacent one or more outlet ports 40 to deflect a portion of the stream in a different flow direction and increase the distribution of the vapor. However, in many applications, sufficient vapor distribution can be achieved without the use of deflectors 44.

It can be readily seen that the vapor distributor 26 serves to distribute the vapor stream entering the column 20. In a process in accordance with the present invention, a vapor stream is introduced into the column 20 through vapor inlet nozzle 28 and enters vapor distributor plenum 32. The vapor stream flows in the plenum 32 around the inner periphery of the column 20 and is split into a plurality of smaller streams which are distributed into the column interior by outlet ports 40. The distributed vapor streams then ascend in the open interior volume of the column 20 and feed into the packing zone 24 positioned above the vapor distributor 26. The vapor entering the packing zone 24 encounters and interacts with a liquid stream which has been introduced into the column at a location above the packing zone 24. Notably, because the vapor entering the packing zone 24 has been uniformly distributed across the horizontal cross-section of column 20, interaction between the vapor and liquid in the packing zone 24 is greatly facilitated, particularly in the lower portions of the packing.

Figures 5, 6:
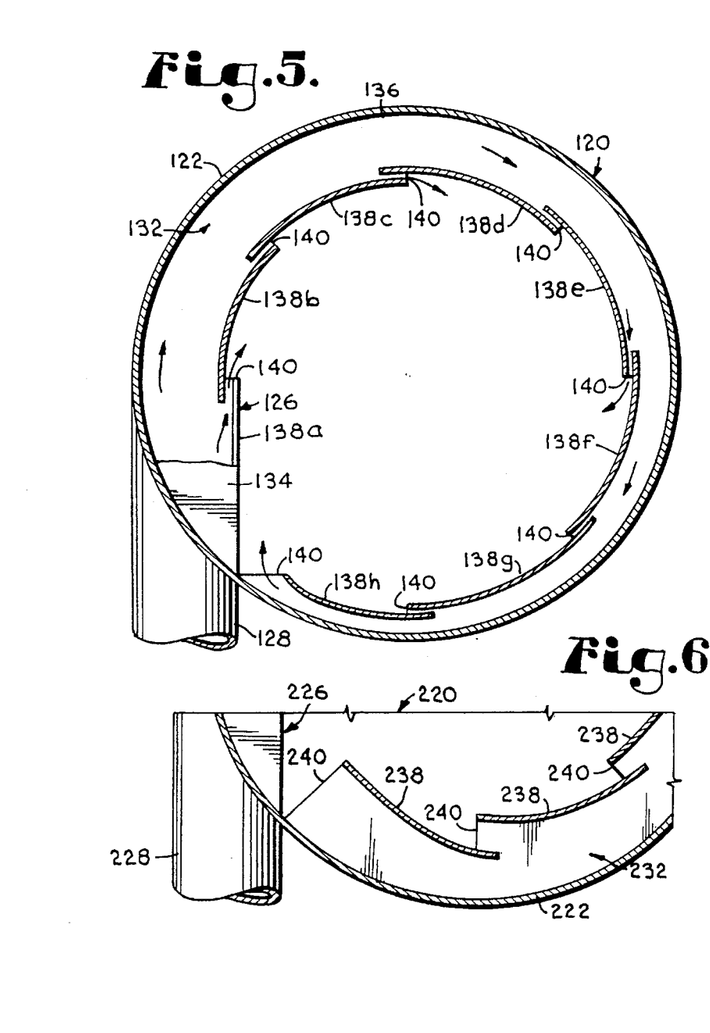
FIG. 5 is a top plan view of another embodiment of a vapor distributor in accordance with the present invention, with portions of the top plate being broken away for purposes of illustration.
FIG. 6 is a fragmentary top plan view of a still further embodiment of a vapor distributor constructed in accordance with the present invention.

Turning now to FIG. 5, an alternate embodiment of a column constructed in accordance with the present invention is designated by the numeral 120. Column 120 is similar to column 20 and the prefix "1" has been added to reference numerals used for components which generally correspond to those components previously described. Column 120 differs from column 20 by utilizing a tangential vapor inlet 128 instead of the radial inlet nozzle 28 used with column 20. Because the vapor stream enters the plenum 132 tangentially to the column shell 122, it is not split into two streams flowing in opposite directions, as is the case with column 20. Instead, the plenum 132 carries the vapor stream in only one direction with substantially equal volume portions of the vapor stream being split off at the circumferentially spaced outlet ports 140. If desired, deflectors 44 of the type shown in FIGS. 2–3 can be mounted in all or a portion of the path of the vapor exiting one or more outlet ports 140.

The plenum 132 in column 120 extends substantially 360° about the inner periphery of the column shell 122. Although the initial inner annular wall segment 138a adjacent the vapor inlet nozzle 128 has been illustrated as being of planar construction, it could alternately be of a curvilinear configuration. Similarly, the flared end of the terminal inner annular wall segment 138h is optional and could be replaced with an end portion which is concentric with the column shell 122. Except for the differences noted above, the column 120 is constructed and operates in substantially the same manner as previously described.

Turning now to FIG. 6 in which reference numerals with the prefix "2" are used for previously described components, a column 220 is shown with an alternate embodiment of a vapor distributor plenum 232. The plenum 232 has inner annular wall segments 238 which are not arranged concentrically with the column shell 222. Instead, the wall segments 238 are arrayed such that only the downstream or terminal end of the wall segments lie within a common circular plane which is generally concentric with the column shell 222. The upstream ends of the wall segments are spaced progressively closer to the column shell in the direction of vapor flow so that the width and cross-sectional area of the outlet ports 240 increases in such direction. Positioning of the wall segments 238 in this manner serves to maintain a substantially constant effective cross-sectional area for the plenum 232 along the circumference thereof. The subdividing of the vapor stream, in combination with the uniform plenum cross-sectional area and increasing cross-sectional area of the outlet ports 240, causes the velocity of the vapor stream to decrease as it flows through the plenum 232 in column 220.

It can be appreciated that other modifications of the vapor distributors previously described can be made and remain within the scope of the invention. As but one example, the ring-shaped bottom plate can be removed from the described embodiments of the vapor distributor. This allows portions of the vapor stream to flow downwardly out of the plenum through the open bottom while other portions flow radially inwardly through the outlet ports in the inner annular wall of the vapor distributor.

Figure 7:
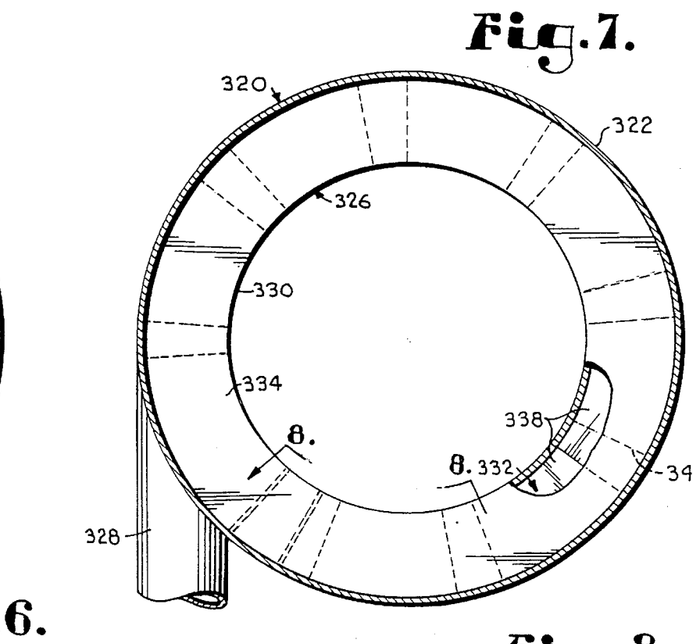
FIG. 7 is a top plan view of a fourth embodiment of a vapor distributor of the present invention.
Figure 8:
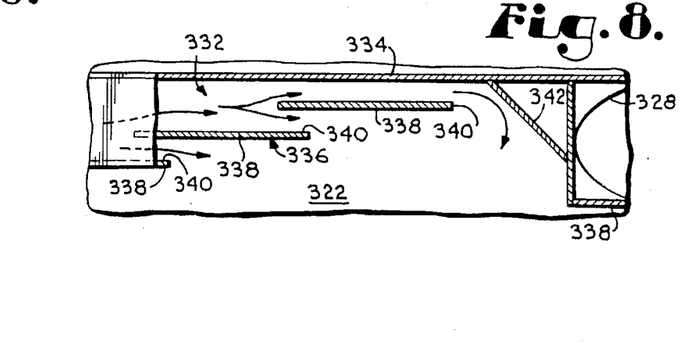
FIG. 8 is a fragmentary side elevation view of the vapor distributor shown in FIG. 7 and taken in vertical section along line 8—8 of FIG. 7 in the direction of the arrows.

Turning now to FIGS. 7–8 in which reference numerals with the prefix "3" are used, a column 320 having a still further embodiment of a vapor distributor 326 is illustrated. Vapor distributor 326 differs from those previously described in that there is no vapor stream discharged through the inner annular wall 330. Instead, the inner annular wall 330 is substantially imperforate and the vapor is discharged from a series of outlet ports 340 formed in the bottom plate 336 of plenum 332. The bottom plate 336 comprises a series of overlapping plate segments 338 which are generally planar in construction. The plate segments 338 extend generally horizontally and are positioned in a vertically staggered arrangement with the distance between successive plate segments and the top plate 334 uniformly decreasing in the direction of vapor flow. This arrangement of the plate segments 338 causes the height and cross-sectional area of the plenum 332 to decrease in the downstream direction and results in uniform distribution of the vapor stream about the periphery of the column 320 in discrete, vertically spaced apart, horizontal planes. Suitable deflectors 44 as shown in FIG. 1 can be used if desired adjacent the outlet ports 340 to deflect all or a portion of the vapor stream. A terminal deflector 342 can be positioned adjacent the final outlet portion 340 to impart a downward deflection to that portion of the vapor stream exiting the port.

Further embodiments of the vapor distributor of the present invention are illustrated in FIGS. 9–22, in which the same reference numerals preceded by the prefix "4" are used to designate components which have been previously described. Distributors 426 have an at least partially open bottom through which all or substantially all of the vapor is discharged. A uniform discharge of the vapor through the open bottom of the distributor 426 is obtained by providing within the distributor a conduit or flow channel 442 having a decreasing cross-sectional area in the direction of vapor flow. As portions of the vapor stream are discharged through the bottom of the distributor 426, the decreasing area of the flow channel 442 serves to maintain the vapor remaining within the flow channel at the desired pressure. By maintaining the desired pressure on the vapor stream in this manner, the quantity of vapor discharged along the annular length of the distributor remains substantially uniform and results in more uniform distribution of the vapor stream across the horizontal cross section of the column 420.

The flow channel 442 can be square, rectilinear, polygonal, round or oval in vertical cross section. As illustrated in FIGS. 9–22, the annular flow channel 442 is rectilinear in cross section and is defined by the top plate 434, inner annular wall 430 and the column shell 422. Although shown with the bottom completely open, it will be appreciated that the flow channel 442 can be partially closed at the bottom if desired.

The decreasing vertical cross section of the flow channel 442 is achieved by placement of the inner annular wall 430 more closely to the column shell 422 in the direction of vapor flow. In each of the embodiments shown in FIGS. 9–18, the inner annular wall 430 is segmented with the segments being concentric with the column shell 422 and placed progressively closer to shell 422 in the direction of vapor flow. The cross-sectional area of the distributor 426 thus decreases in a step-wise manner in the direction of vapor flow. The number of wall segments utilized can vary as desired. Alternatively, as shown in FIGS. 19–22, the inner annular wall 430 can extend in a continuous curve so that the narrowing of the flow channel 442 is continuous rather than step-wise.

When the inner annular wall 430 is formed by concentric segments as in the distributors shown in FIGS. 9–18, an upright deflector wall 444 is placed at the downstream end of each inner annular wall segment and is connected to the upstream end of the next inner annular wall segment. Another deflector wall 444a is also positioned at the downstream end of the final annular wall segment and is joined to the column shell 422 to close the end of the vapor flow channel 442.

The deflector walls 444 not only form the transition between the inner annular wall 430 segments, but also serve to disrupt and deflect the flow of that portion of the vapor stream traveling in the flow channel 442 adjacent to the inner annular wall 430. The deflection of the vapor stream in this manner causes an increase in the turbulence and the resulting mixing of the entire vapor stream flowing within the flow channel 442. A portion of the deflected vapor stream is also directly funneled out of the open bottom of the distributor 426 by the deflector walls 444. The vapor stream is thus discharged from the distributor 426 by both the increase in flow resistance as it travels through the constricting flow channel 442 and the deflector walls 444 which interrupt the flow of portions of the vapor stream.

Figures 9, 10, 11, 12, 13:
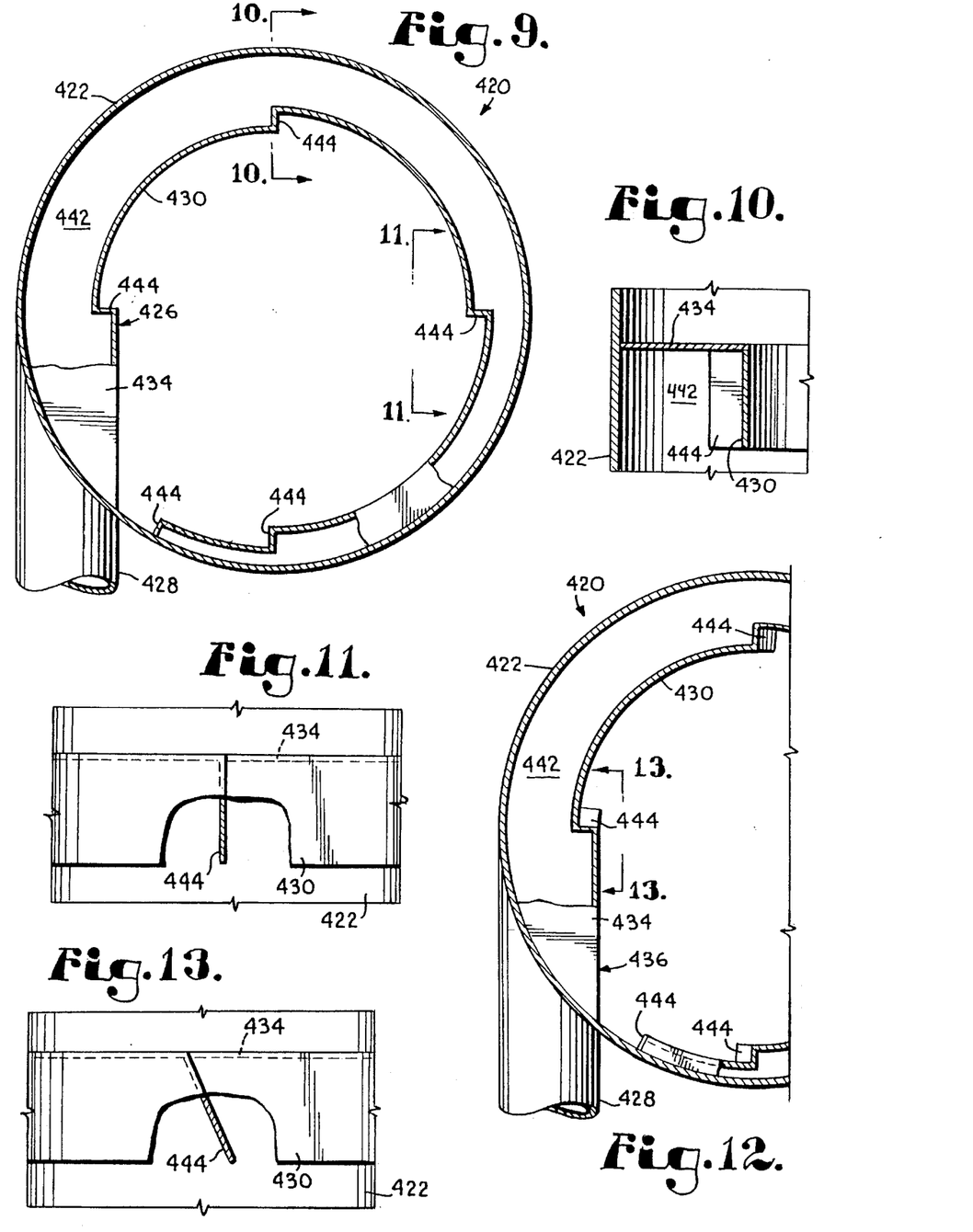
FIG. 9 is a top plan view of another embodiment of a vapor distributor, portions being broken away to illustrate the open bottom of the distributor.
FIG. 10 is a fragmentary elevation view of the vapor distributor shown in FIG. 9 and taken in vertical section along line 10—10 of FIG. 9 in the direction of the arrows.
FIG. 11 is a fragmentary side elevation view of the vapor distributor shown in FIG. 9 and taken in vertical section along line 11—11 of FIG. 9 in the direction of the arrows, portions being broken away to show the open bottom of the distributor.
FIG. 12 is a fragmentary top plan view of still another embodiment of a vapor distributor of the present invention, portions being broken away to illustrate details of construction.
FIG. 13 is a fragmentary side elevation view of the vapor distributor shown in FIG. 12 and taken in vertical section along line 13—13 of FIG. 12 in the direction of the arrows, portions of an inner wall of the distributor being broken away for purposes of illustration.

The deflector walls 444 can be oriented in various ways depending upon the particular flow pattern desired. As shown in FIGS. 9–11, each deflector wall 444 can be positioned to lie along a radial line. The radial deflector walls 444 thus extend generally perpendicular to the inner annular wall and parallel to the vertical axis of the column 420.

Alternatively, as shown in FIGS. 12 and 13, the radial deflector walls 444 can be inclined at an angle to the vertical axis of column 420 in the direction of flow of the vapor stream. Inclination of the deflector walls 444 in this manner increases the downward deflection of the vapor stream in comparison to the vertically oriented deflector walls 444 and more efficiently funnels portions of the vapor stream downwardly and out of the bottom of the distributor 426. It will be appreciated that the angle of inclination can vary from that illustrated and remain within the scope of the invention.

Figure 14:
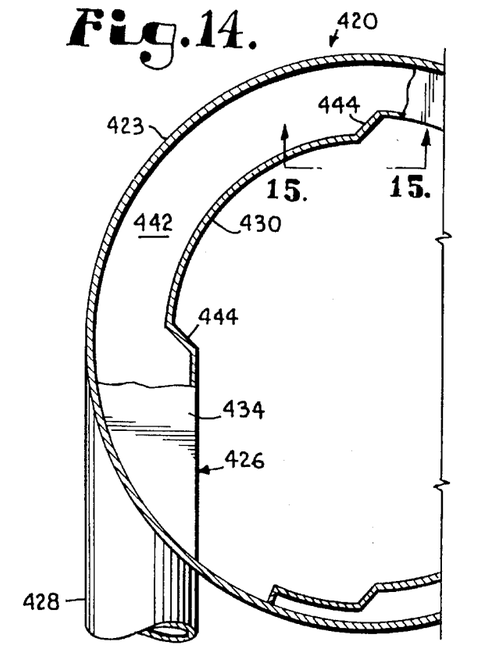
FIG. 14 is a fragmentary top plan view of a further embodiment of a vapor distributor with portions broken away to illustrate details of construction.
Figure 15:
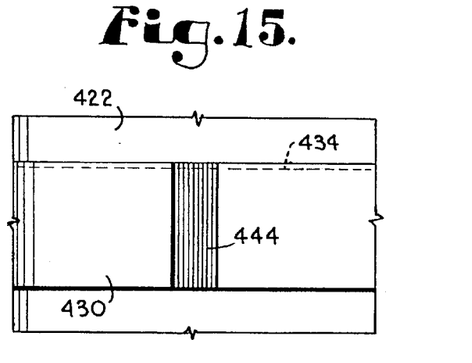
FIG. 15 is a fragmentary side elevation view of the vapor distributor shown in FIG. 14 and taken along line 15—15 of FIG. 14 in the direction of the arrows.

Another variation of the orientation of the deflector walls 444 is shown in FIGS. 14 and 15, wherein the deflector walls are vertical but are angled with respect to the radial line or radius of the column 420. The angled deflector walls 444 provide a smoother transition between the inner annular wall 430 segments in comparison to the radial deflector walls and are less disruptive to the flow of the vapor stream. As a result, the vapor stream is preferentially funneled radially outward rather than downwardly.

Figure 16:
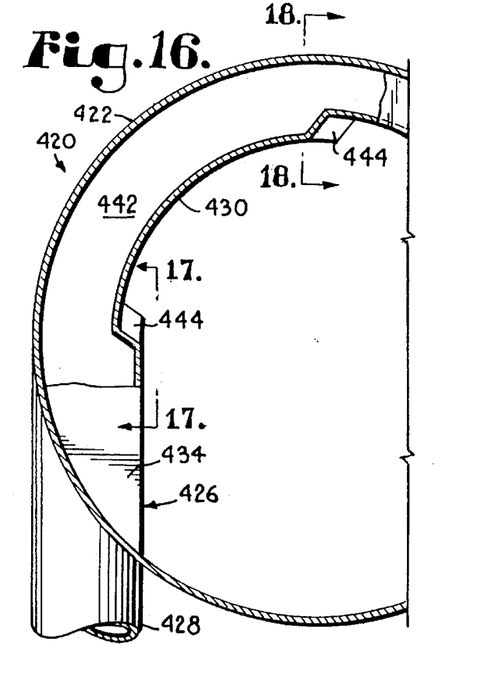
FIG. 16 is a fragmentary top plan view of a still further embodiment of a vapor distributor of the present invention, portions being broken away to shown the open bottom of the distributor.
Figure 17:
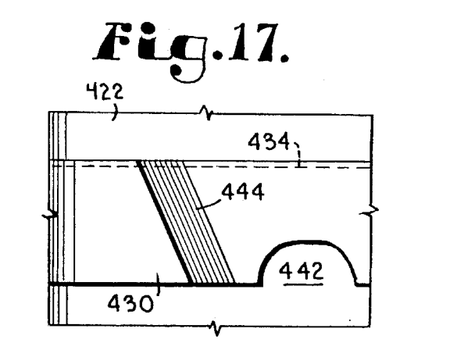
FIG. 17 is a fragmentary side elevation view of the vapor distributor shown in FIG. 16 and taken in vertical section along line 17—17 of FIG. 16 in the direction of the arrows.
Figure 18:
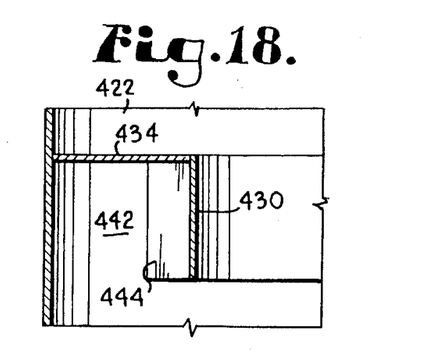
FIG. 18 is a fragmentary elevation view of the vapor distributor shown in FIG. 16 and taken in vertical section along line 18—18 of FIG. 16 in the direction of the arrows.
Figures 19, 20:
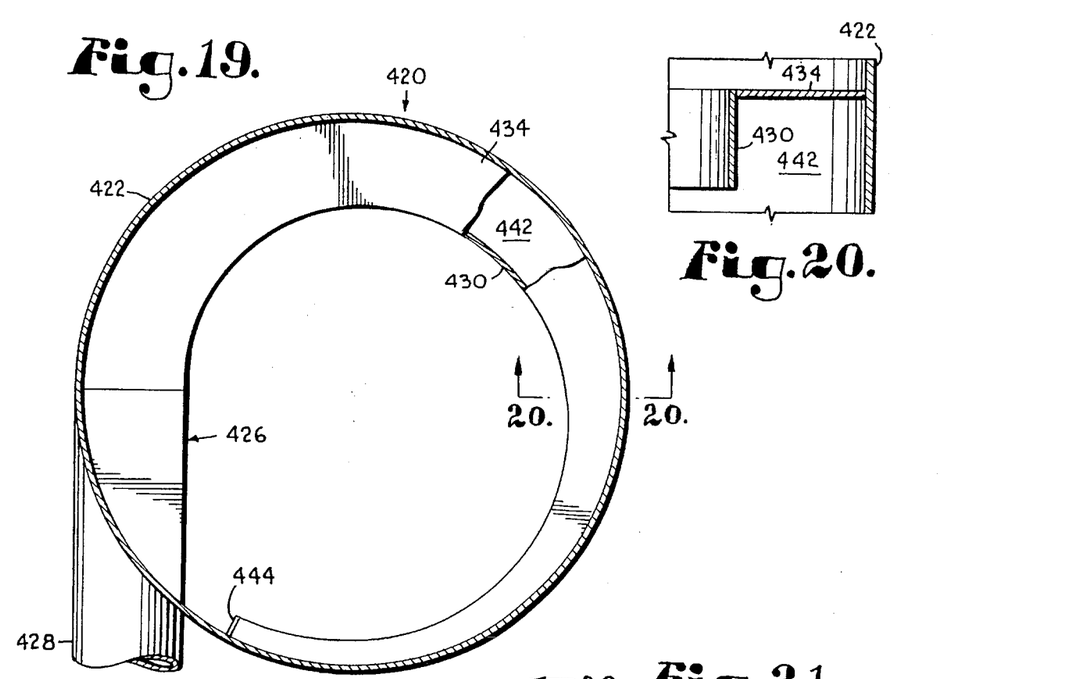
FIG. 19 is a top plan view of another embodiment of a vapor distributor of the present invention, portions of the closed top of the distributor being broken away to show the open bottom of the distributor.
FIG. 20 is a fragmentary elevation view of the vapor distributor shown in FIG. 19 and taken in vertical section along line 20—20 of FIG. 19 in the direction of the arrows.

A still further variation of the orientation of the deflector walls 444 is shown in FIGS. 16–18, with the deflector walls 444 extending at an angle to both the column vertical axis and the radial line. The angled deflector walls 444 thus serve to preferentially funnel portions of the vapor stream downwardly and radially outwardly at the same time.

Figures 21, 22:
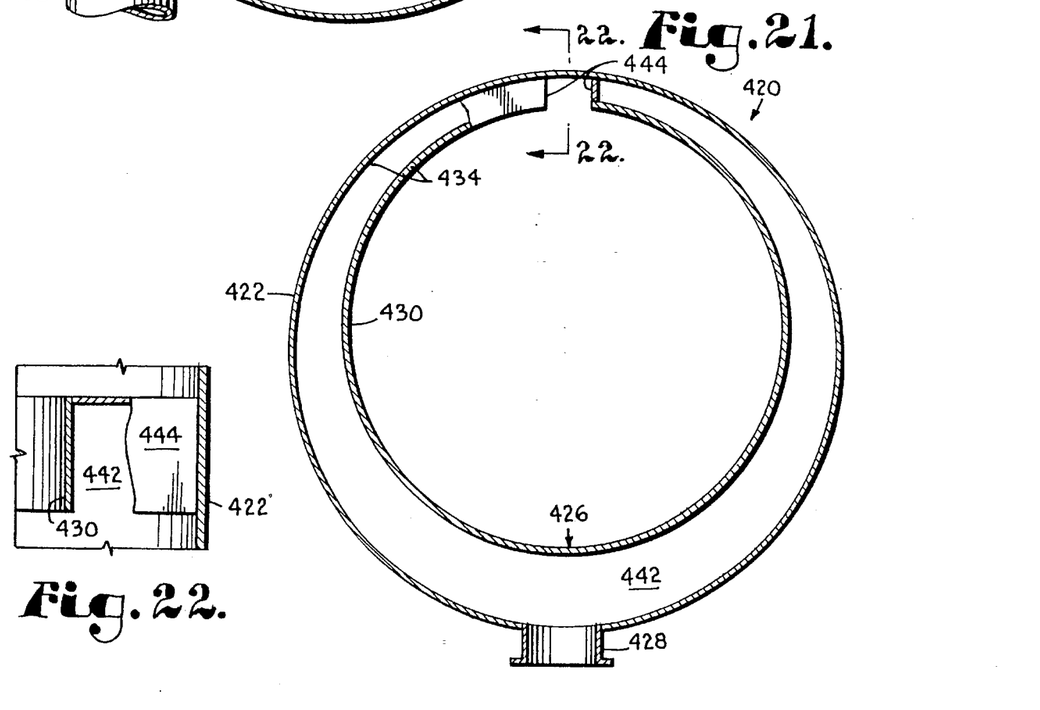
FIG. 21 is a top plan view of a further embodiment of a vapor distributor of the present invention, portions of the closed top of the distributor being broken away to show the open bottom of the distributor.
FIG. 22 is a fragmentary elevation view of the vapor distributor shown in FIG. 21 and taken in vertical section along line 22—22 of FIG. 21 in the direction of the arrows.

In the distributor embodiments illustrated in FIGS. 19–22, the use of deflector walls 444 is unnecessary because the inner annular wall 430 extends in a continuous curve resulting in a continuous narrowing of the flow channel 442 in the direction of vapor flow. The inner annular wall 430 in FIG. 19 extends along a spiral while the inner annular wall 430 in FIG. 21 is generally circular because of the bidirectional flow path of the vapor stream.

The distributors 426 shown in FIGS. 9–22 can be operated in a manner similar to the distributors previously described to cause a uniform distribution of a vapor stream entering column 420 through inlet nozzle 428. In order to allow the volumetric flow rate of vapor exiting the open bottom of the distributor 426 to remain substantially uniform along the length of the distributor, the amount by which the area of the flow channel 442 decreases along its length is selected in conjunction with the volumetric vapor flow rates, inlet vapor pressure and temperature, specific gravity of the vapor, and length of the flow channel.

The pressure differential between the vapor flowing in the distributor 426 and in adjacent areas of the column 420 causes portions of the vapor stream to flow out the open bottom of the distributor. By decreasing the area available within the distributor 426 for the flow of the vapor stream as it travels along the flow channel 442, a more controlled pressure differential is maintained along the length of the distributor. This then results in a more uniform discharge of the vapor stream along the annular length of the distributor, with the discharged vapor stream being more uniformly distributed across the horizontal cross section of the column 420 prior to entry into the overlying packing.

Under certain operating conditions, the circumferential discharge of vapor through the bottom and sides of the previously described vapor distributors may produce a swirling or cyclonic flow of vapor. In certain situations, this cyclonic vapor flow may be objectionable because it produces a vapor velocity gradient which increases from a low velocity zone in the center of the column to a high velocity zone near the inner wall of the vapor distributor. It has been determined that, in accordance with presently preferred embodiments of the vapor distributor, the positioning of deflectors upwardly along the radial inner wall of the distributor can effectively disrupt the cyclonic vapor flow and cause more uniform horizontal distribution of the vapor stream as it enters the overlying packing.

Figure 23:
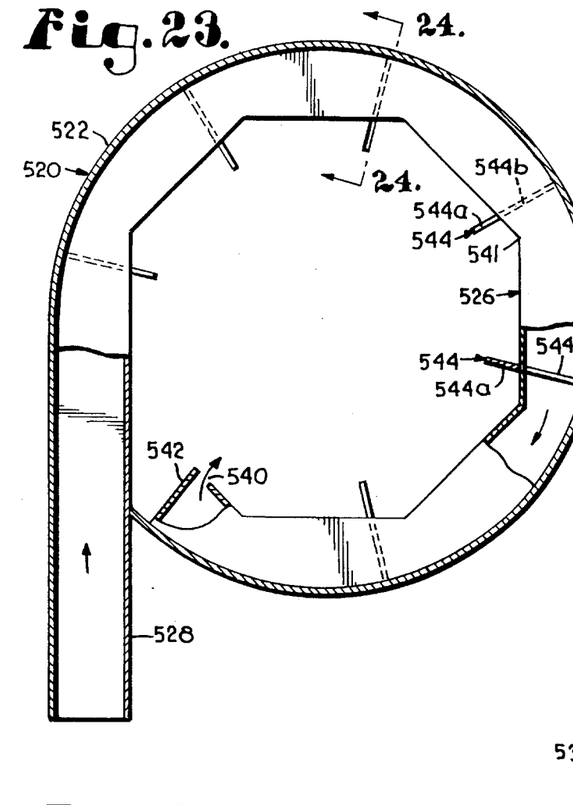
FIG. 23 is a top plan view of another embodiment of a vapor distributor of the present invention, the view being taken in horizontal section and with portions of the distributor being broken away for purposes of illustration.
Figure 24:
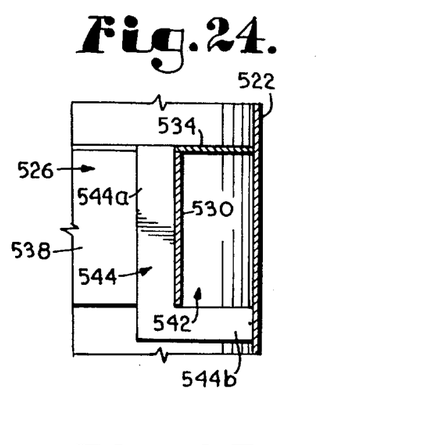
FIG. 24 is a fragmentary side elevation view of the vapor distributor taken in vertical section along line 24—24 of FIG. 23 in the direction of the arrows.
Figure 25:
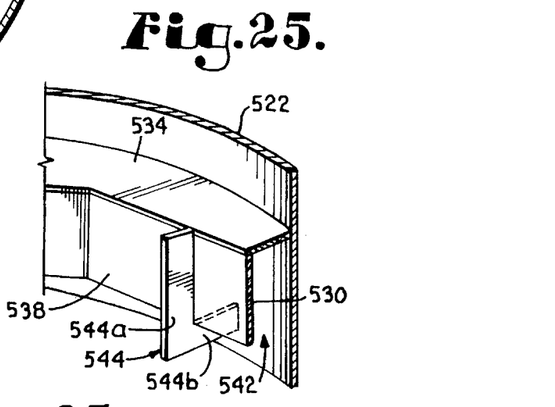
FIG. 25 is a fragmentary perspective view of a portion of the distributor shown in FIG. 23.

Turning now to FIGS. 23–25, a modified vapor distributor 526 is shown mounted within a column 520 having an external shell 522. The distributor 526 includes circumferentially spaced L-shaped deflectors 544 which extend upwardly along the inner annular wall 530 of the distributor 526. The deflectors 544 are generally planar, but can be curved or segmented if desired. Each deflector 544 includes a first portion 544a which extends upwardly along inner annular wall 530 to disrupt the cyclonic or swirling vapor flow by contacting the vapor flowing along the inner annular wall 530 and redirecting it toward the center of the column. The first portion 544a of the deflector 544 may extend generally vertically or it may be inclined at an angle to the vertical. The first portion 544a may also extend radially or at an angle to the radial, much like the deflector walls 444 previously described, to redirect the vapor stream toward the center portion of the column. The radial dimension of the deflector first portions 544a is preferably sufficient to disrupt and redirect vapor flowing along a boundary layer adjacent the inner annular wall 530. Deflectors with longer radial dimensions are in general more effective at redirecting the vapor stream toward the center of the column. The vertical dimension for the first portion 544a of the deflector should typically be sufficient to extend along all or at least a substantial portion of the vertical height of the inner annular wall 530. If desired, the first portion 544a may extend upwardly beyond the top of the inner annular wall 530 and the top plate 534.

One or more deflectors 544 may also include an optional second portion 544b which extends from below the inner annular wall outwardly beneath the flow channel 542 in the direction of the column shell. This second portion 544b of the deflector serves to divert, in a radially inward direction, a portion of the vapor stream discharged through the at least partially open bottom of the distributor. The second portion 544b, to a lesser extent, also downwardly diverts the discharged vapor stream. Although the second portion 544b is illustrated as being integrally joined with upright first portion 544a to form the L-shaped deflector 544, it is to be understood that one or more deflectors may be formed with only the second portion 544b or the first portion 544a. The deflector second portions 544b may extend generally horizontally or may be inclined at an angle to the horizontal. The second portions 544b may also extend radially or at an angle to the radial to divert the vapor stream in the desired direction toward the center portion of the column. It is to be understood that the second portions 544b may be omitted in certain applications so that the deflectors 544 consist of only the upright first portions 544a.

The deflectors 544 must have sufficient structural strength to withstand the stresses to which they are subjected during operation of the column. The number and positioning of the deflectors 544 can be varied as desired to suit the requirements for particular applications.

The deflectors 544 can be used in association with vapor distributors, including those previously described, in which all or part of the vapor is discharged through outlets formed in the inner annular wall or in which all or part of the vapor is discharged through the open bottom of the distributor. In general, it is desirable for most or all of a vapor stream containing substantial amounts of liquid to be discharged through the open bottom of the distributor rather than through the inner annular wall. This downward discharge of liquid-containing vapor streams provides more opportunity for liquid to disengage from the vapor stream prior to entering the overlying packing. In situations where liquid entrainment is of less concern, such as when little or no liquid is present in the vapor stream, a greater portion of the vapor stream may be discharged through outlets in the inner annular wall.

In the embodiment illustrated in FIGS. 23–25, the inner annular wall 530 is formed from a plurality of generally planar segments 538 which are generally concentric with the column shell 522 so that the cross-sectional area of the flow channel 542 remains substantially constant in the direction of vapor flow. The ends of adjacent segments 538 are connected together to form the substantially continuous inner annular wall 530.

A terminal end of the flow channel 542 includes a terminal deflector 542 and an optional outlet port 540 which cooperate to deflect the vapor stream radially inwardly toward the center of the column 520. Most of the vapor stream, however, is discharged downwardly through the open bottom of the distributor 526 before it reaches the outlet port 540. In certain applications, the outlet port 540 can be omitted so that all of the vapor stream is discharged through the bottom of the distributor.

Figure 26:
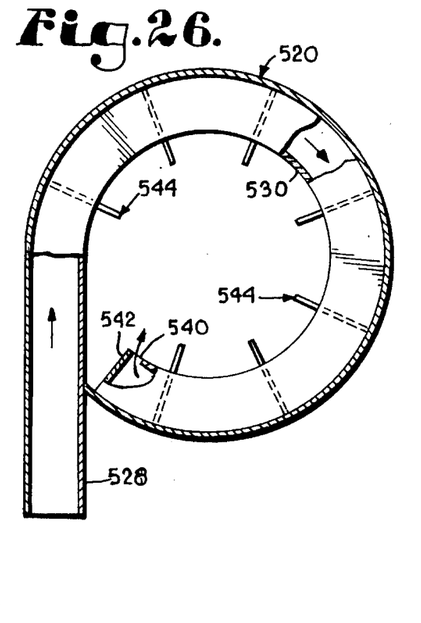
FIG. 26 is a top plan view of another embodiment of the vapor distributor.

Rather than using planar wall segments 538 in distributor 526, the inner annular wall 530 can be of a continuous curved construction as illustrated in FIG. 26. The wall 530 is concentric with the column shell 522 so that the flow channel 542 is of constant cross-section along its length. Again, a terminal deflector 542 and outlet port 540 are preferably used to permit a portion of the vapor stream to be discharged through the inner annular wall 530, with the remaining portions of the vapor stream being discharged through the open bottom of the distributor.

Figure 27:
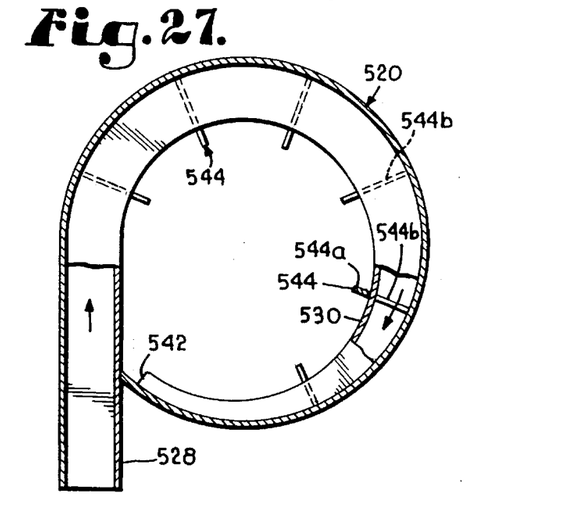
FIG. 27 is a top plan view of still another embodiment of the vapor distributor.

Another variation of the distributor 526 is shown in FIG. 27 in which a progressively narrowing flow channel 542 is provided by spacing the inner annular wall 530 closer to the column shell 522 in the direction of vapor flow. In this embodiment, a vapor outlet port is not provided at the terminal end of the inner annular wall. Instead, all of the vapor flow is discharged out of the open bottom of the distributor.

Figure 28:
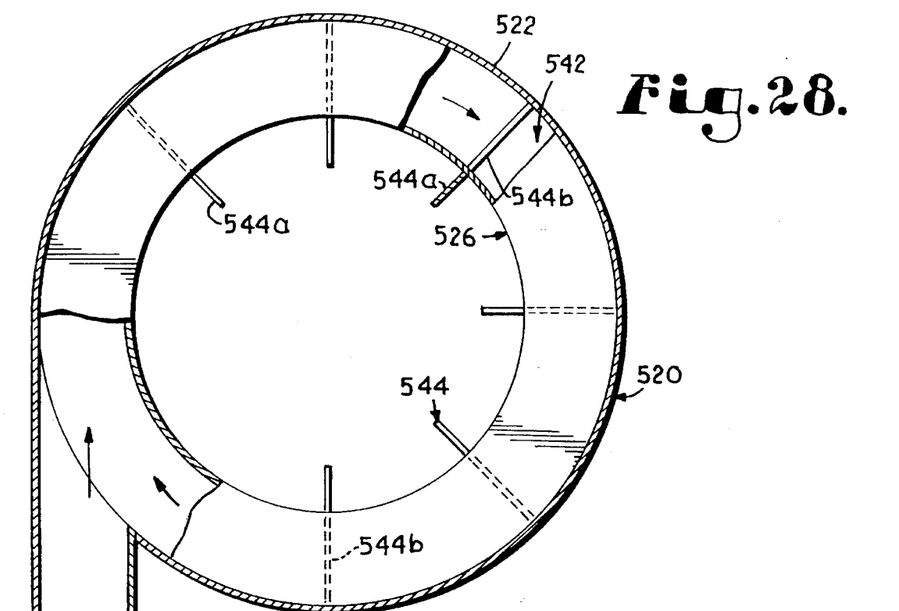
FIG. 28 is a top plan view of yet another embodiment of the vapor distributor.

In FIG. 28, the inner annular wall 530 is concentric with the column shell 522 and forms a complete circle so that the vapor flow channel 542 extends completely around the inner circumference of the column shell 522. As a result, any of the vapor stream remaining in the flow channel 542 after it completes it loop around the inner circumference is picked up by and mixes with the flow stream entering through the inlet nozzle 528.

Figure 29:
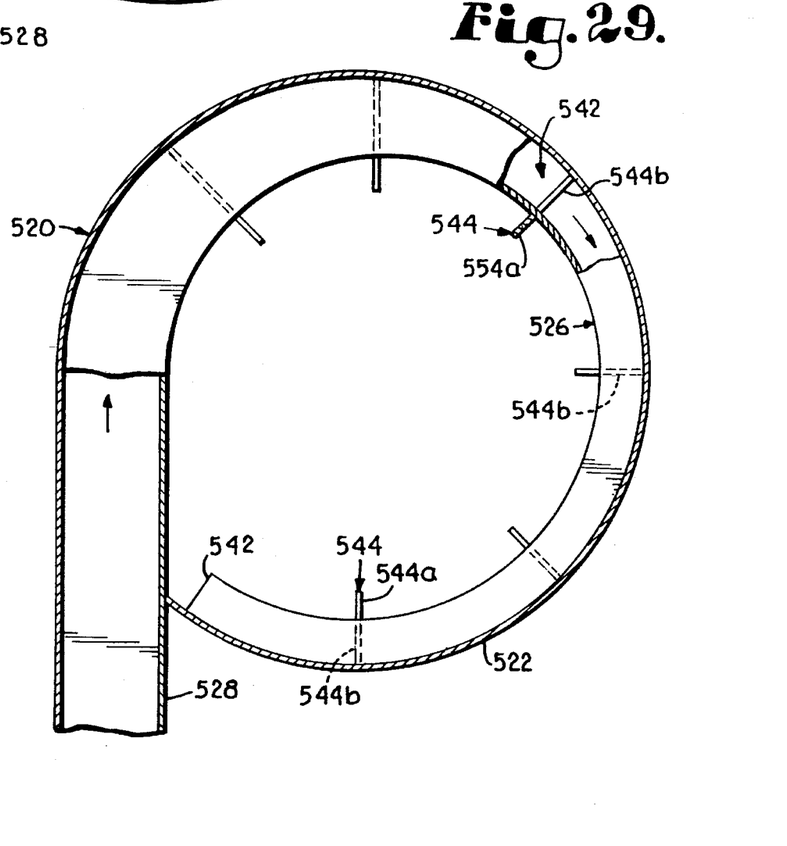
FIG. 29 is a top plan view of a still further embodiment of the vapor distributor.

The distributor 526 shown in FIG. 29 utilizes an inner annular wall 530 which is spaced progressively closer to the column shell 522 along an upstream portion and then remains at a constant spacing from the shell 522 along a downstream portion of its length. This placement of the inner annular wall 530 produces an annular flow channel 542 which has a decreasing cross-sectional area along the upstream portion and a constant cross-sectional area along the downstream portion of its length. The relative lengths of the upstream and downstream portions can be varied as desired. In general, the decreasing upstream portion of the flow channel 542 may comprise approximately one-third to two-thirds of the length of the flow channel, with the balance consisting of the constant downstream portion of the flow channel. Improved horizontal vapor distribution has been found to result from this type of decreasing followed by constant cross-sectional vapor flow area, including when used in combination with a terminal outlet in the inner annular wall as shown in FIG. 23.

The deflectors 544 are used with the distributors shown in FIGS. 23–29 in the manner previously described. The upright portion 544a of the deflectors 544 disrupts the cyclonic or swirling vapor flow along the inward face of the inner annular wall 530 and redirects the vapor flow toward the center of the column 520. Disruption and redirection of the vapor flow in this manner causes a more uniform horizontal distribution of the vapor as it enters the overlying packing, with a resulting increase in the mass transfer occurring within the packing. The optional second portion 544b of the deflectors 544 also directs the vapor stream radially inwardly after it is discharged through the open bottom of the distributor 526, thereby reducing the opportunity for cyclonic vapor flow to become established in the area beneath the distributor.

Figure 30:
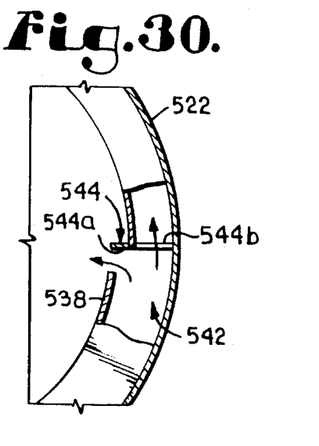
FIGS. 30–37 are fragmentary top plan views showing further variations of the vapor distributors of the present invention.

Variations in the placement of the L-shaped deflector 544 and construction of the outlet ports 540 are illustrated in FIGS. 30–37. Turning first to FIG. 30, the deflector 544 can be placed, in a manner similar to deflector walls 444 previously described, at the downstream end of concentric inner annular wall segments 538 which are spaced progressively closer to the column shell 522. An outlet port 540 is positioned immediately upstream from the deflector 544. As the vapor stream travels through the flow channel 542, a portion of the flow stream is diverted by the deflector 544 and is discharged through the outlet port 540 toward the center of the column.

Figure 31:
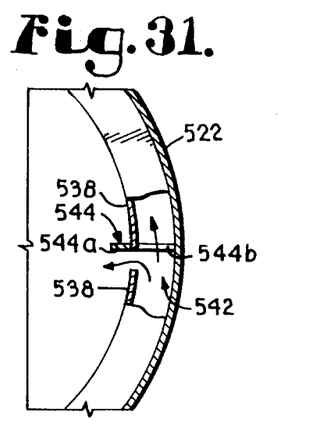
Figure 32:
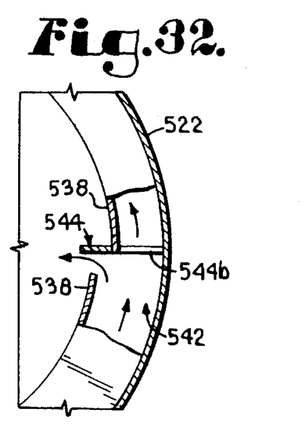

In FIG. 31, the deflector 544 does not lie in the flow path of the vapor stream traveling through the flow channel 542 because of the concentric alignment of the inner annular wall segments. Alternatively, as shown in FIG. 32, the deflector 544 may lie in the flow path and extend inwardly beyond the upstream inner annular wall segment 538 so that it diverts vapor from within the flow channel 542 as well as vapor flowing along the inner facing side of the annular wall segment 538.

Figure 33:
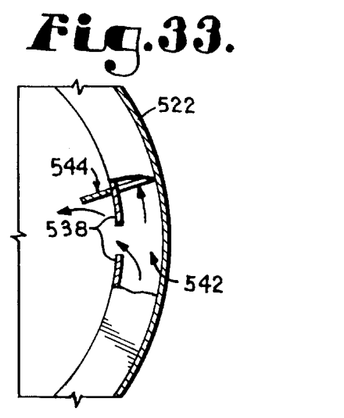
Figure 34:
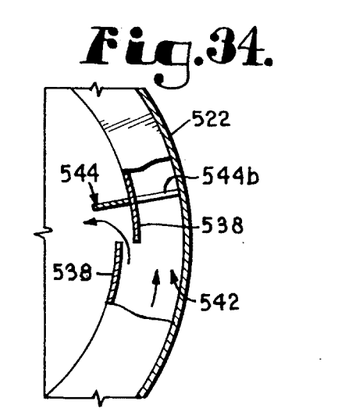
Figure 35:
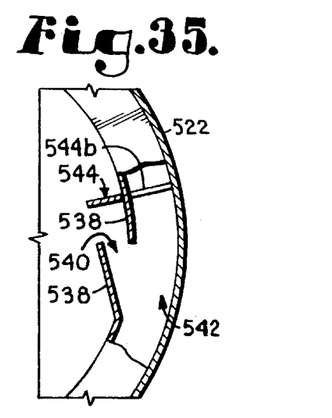
Figure 36:
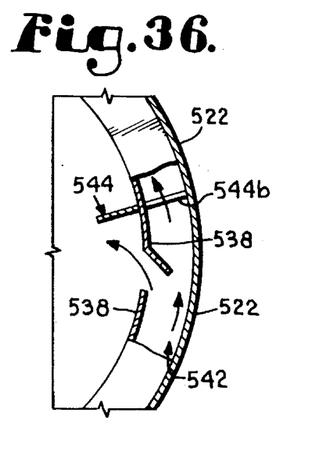
Figure 37:
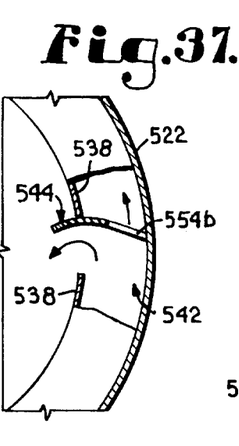

Rather than being positioned at the juncture between inner annular wall segments 538, the deflector 544 may be spaced downstream from the juncture as shown in FIGS. 33 and 34. The upstream inner annular wall segment 538 may also be angled inwardly toward the center of the column to provide increased flow area for vapor exiting through outlet port 540 as shown in FIG. 35. Alternatively, as can be seen in FIG. 36, a portion of the downstream annular wall segment 538 adjacent the outlet port 540 may be angled outwardly toward the column shell 522 so that it extends into the flow channel 542 to divert a portion of the vapor stream from within the flow channel 542. This same function can be achieved by positioning the deflector 544 so that it extends into the flow channel 542 as well as inwardly beyond the wall segment 538, as shown in FIG. 37. The deflector 544 illustrated in FIG. 37 is slightly concave in the upstream direction.

Figure 38:
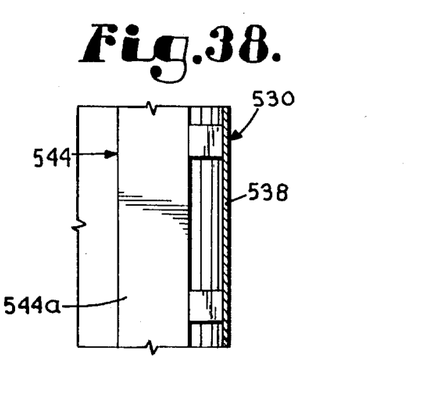
FIG. 38 is a fragmentary side elevation view of another deflector of the present invention.

As can be seen in FIG. 38, in some applications the deflector 544 may be spaced inwardly from the inner annular wall 530 so that a portion of the vapor flow circumferentially along the inner annular wall may flow between the deflector 544 and the wall 530. The spacing can be varied as desired to control the amount of the vapor flow that is allowed to pass between the deflector and the wall and the amount of vapor flow that contacts and is diverted by the deflector 544.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A vapor distribution apparatus for placement within a mass transfer or heat exchange column having an external shell, a vapor inlet nozzle which extends through the external shell and an open interior volume through which vapor and liquid streams may flow and interact, said apparatus comprising:

a distributor defining an annular flow channel adapted for placement in vapor flow communication with the vapor inlet nozzle to receive a vapor stream entering the column through the vapor inlet nozzle and convey the vapor stream in at least one direction of flow about an inner periphery of the column shell, said distributor having an inner annular wall which defines a radially inner wall of the flow channel and a top plate which forms an at least substantially closed top of the flow channel, said inner annular wall having a outward side facing said flow channel and an inward side facing away from said flow channel, said distributor further having an at least partially open bottom in vapor flow communication with the flow channel to permit at least portions of the vapor stream in the flow channel to be discharged through the at least partially open bottom, and including a deflector having a first portion extending generally upwardly along said inward side of the inner annular wall to contact vapor traveling circumferentially along said inward side of the inner annular wall and divert it away therefrom.

2. The apparatus as set forth in claim 1, wherein said first portion of the deflector diverts said circumferentially traveling vapor generally toward a center portion of the column.

3. The apparatus as set forth in claim 2, wherein said first portion of the deflector is positioned against said inward side of the inner annular wall to prevent said circumferentially traveling vapor from passing between said first portion and the inward side of the inner annular wall.

4. The apparatus as set forth in claim 2, wherein said first portion of the deflector is spaced from the inward side of the inner annular wall to permit a portion of said circumferentially traveling vapor to pass between said first portion and the inward side of the inner annular wall.

5. The apparatus as set forth in claim 2, including an outlet formed in the inner annular wall to allow the discharge of a portion of the vapor stream from the flow channel through the outlet.

6. The apparatus as set forth in claim 5, wherein said outlet is formed in a terminal portion of the inner annular wall.

7. The apparatus as set forth in claim 2, including a plurality of spaced apart outlets formed in the inner annular wall to allow the discharge of a portion of the vapor stream from the flow channel through the outlets.

8. The apparatus as set forth in claim 2, wherein the inner annular wall is spaced a substantially constant distance from the column external shell along a circumferential length of the inner annular wall to provide a substantially constant cross-sectional area for the annular flow channel along the circumferential length thereof.

9. The apparatus as set forth in claim 2, wherein the inner annular wall is spaced a closer distance to the column external shell in the direction of circumferential vapor flow to provide a decreasing cross-sectional area for the annular flow channel in said direction of circumferential vapor flow.

10. The apparatus as set forth in claim 2, wherein an upstream portion of the inner annular wall is spaced a progressively closer distance to the column external shell in the direction of circumferential vapor flow and a downstream portion of the inner annular wall is spaced a substantially constant distance from the column external shell in said direction of circumferential vapor flow.

11. The apparatus as set forth in claim 2, including an outlet formed in a terminal portion of the inner annular wall to allow the discharge of a portion of the vapor stream from the flow channel through the outlet and wherein the inner annular wall is spaced a closer distance to the column external shell in the direction of circumferential vapor flow to provide a decreasing cross-sectional area for the annular flow channel in said direction of circumferential vapor flow.

12. The apparatus as set forth in claim 11, including a second portion of the deflector extending below the inner annular wall to divert a portion of said vapor stream discharged through the at least partially open bottom.

13. The apparatus as set forth in claim 12, wherein said second portion of the deflector extends from below the inner annular wall outwardly beneath said flow channel.

14. A vapor distribution apparatus for placement within a mass transfer or heat exchange column having an external shell, a vapor inlet nozzle which extends through the external shell and an open interior volume through which vapor and liquid streams may flow and interact, said apparatus comprising:

a distributor defining an annular flow channel adapted for placement in vapor flow communication with the vapor inlet nozzle to receive a vapor stream entering the column through the vapor inlet nozzle and convey the vapor stream in at least one direction of flow about an inner periphery of the column shell, said distributor having an inner annular wall which defines a radially inner wall of the flow channel and a top plate which forms an at least substantially closed top of the flow channel, said inner annular wall having a outward side facing said flow channel and an inward side facing away from said flow channel, said distributor further having an at least partially open bottom in vapor flow communication with the flow channel to permit at least portions of the vapor stream in the flow channel to be discharged through the at least partially open bottom, and including a deflector having a first portion extending generally upwardly along said inward side of the inner annular wall to contact vapor traveling circumferentially along said inward side of the inner annular wall and divert it away therefrom, said deflector having a second portion extending from below the inner annular wall outwardly beneath said flow channel to divert a portion of said vapor stream discharged through the at least partially open bottom in a radially inward direction.

15. The apparatus as set forth in claim 14, including a plurality of said deflectors circumferentially spaced apart.

16. The apparatus as set forth in claim 15, wherein said first portion of the deflector diverts said circumferentially traveling vapor toward a center portion of the column.

17. The apparatus as set forth in claim 16, wherein said first portion of the deflector is positioned against said inward side of the inner annular wall to prevent said circumferentially traveling vapor from passing between said first portion and the inward side of the inner annular wall.

18. The apparatus as set forth in claim 16, wherein said first portion of the deflector is spaced away from the inward side of the inner annular wall to permit a portion of said circumferentially traveling vapor to pass between said first portion and the inward side of the inner annular wall.

19. The apparatus as set forth in claim 16, including an outlet formed in the inner annular wall to allow the discharge of a portion of the vapor stream from the flow channel through the outlet.

20. The apparatus as set forth in claim 19, wherein said outlet is formed in a terminal portion of the inner annular wall.

21. The apparatus as set forth in claim 16, including a plurality of spaced apart outlets formed in the inner annular wall to allow the discharge of a portion of the vapor stream from the flow channel through the outlets.

22. The apparatus as set forth in claim 16, wherein the inner annular wall is spaced a substantially constant distance from the column external shell along a circumferential length of the inner annular wall to provide a substantially constant cross-sectional area for the annular flow channel along the circumferential length thereof.

23. The apparatus as set forth in claim 16, wherein the inner annular wall is spaced a closer distance to the column external shell in the direction of circumferential vapor flow to provide a decreasing cross-sectional area for the annular flow channel in said direction of circumferential vapor flow.

24. The apparatus as set forth in claim 16, wherein an upstream portion of the inner annular wall is spaced a progressively closer distance to the column external shell in the direction of circumferential vapor flow and a downstream portion of the inner annular wall is spaced a substantially constant distance from the column external shell in said direction of circumferential vapor flow.

25. The apparatus as set forth in claim 16, including an outlet formed in a terminal portion of the inner annular wall to allow the discharge of a portion of the vapor stream from the flow channel through the outlet and wherein the inner annular wall is spaced a closer distance to the column external shell in the direction of circumferential vapor flow to provide a decreasing cross-sectional area for the annular flow channel in said direction of circumferential vapor flow.

26. A method for distributing a vapor stream from a distributor within a mass transfer or heat exchange column, said method comprising the steps of:

introducing the vapor stream into the distributor through a vapor inlet nozzle which extends through an external shell of the column;

directing the vapor stream in a circumferential direction within said distributor;

discharging at least a portion of said vapor stream from within said distributor through an at least partially open bottom of the distributor;

allowing said discharged vapor stream to rise through an inner annular space within the distributor while traveling in said circumferential direction; and contacting said rising vapor stream against a deflector having a first portion extending generally upwardly along a radially inward side of an inner annular wall of the distributor to divert the rising vapor stream away from said circumferential direction to cause a more uniform horizontal distribution of the rising vapor stream.

27. The method as set forth in claim 26, wherein said step of diverting the rising vapor stream comprising the step of diverting the rising vapor stream toward a center portion of the column.

28. The method as set forth in claim 27, including the step of discharging another portion of said vapor stream from within said distributor through an outlet in said inner annular wall.

29. The method as set forth in claim 27, wherein said step of discharging said portion of said vapor stream through the open bottom of the distributor includes the step of contacting the vapor stream against a deflector portion extending from below the inner annular wall outwardly beneath said flow channel to divert said portion of said vapor stream in a generally radially inward direction.

30. The method as set forth in claim 29, wherein the vapor stream is discharged through the open bottom of the distributor and comprises discharging the vapor stream in response to a decreasing cross-sectional area of the flow channel.

31. The method as set forth in claim 26, including the step of then directing the vapor stream into a packing overlying the distributor.

* * * * *